United States Patent
Fero

[11] 3,767,147
[45] Oct. 23, 1973

[54] DRILLING RIG

[76] Inventor: Joseph Bernard Fero, 481 Leslie Ave., Thunder Bay, Ontario, Canada

[22] Filed: Oct. 21, 1971

[21] Appl. No.: 191,384

[52] U.S. Cl. ............................. 248/16, 173/43
[51] Int. Cl. ...................... E21c 5/00, E21c 11/02
[58] Field of Search ............ 248/16, 2; 173/42, 173/43, 28; 172/807

[56] References Cited
UNITED STATES PATENTS

| | | | |
|---|---|---|---|
| 3,559,415 | 2/1971 | Vaughan et al. | 173/43 X |
| 2,859,014 | 11/1958 | Berner | 173/43 X |
| 2,168,522 | 8/1939 | Hart et al. | 173/43 |
| 3,645,343 | 5/1970 | Mays | 173/43 |
| 3,490,548 | 1/1970 | Lake | 173/43 |
| 3,225,842 | 12/1965 | Roeschen | 173/43 X |

Primary Examiner—J. Franklin Foss
Attorney—Westell & Hanley

[57] ABSTRACT

A mounting member is attachable to a vehicle and carries through a rotationally controlable hinged connection a mounting bar for a plurality of drills.

2 Claims, 2 Drawing Figures

Patented Oct. 23, 1973

3,767,147

JOSEPH B. FERO
INVENTOR

BY

Westell & Hanley

DRILLING RIG

This invention relates to a drilling rig comprising an adjustable mount for attachment to a vehicle such as a tractor for example, a tractor, and to serve as an adjustable mounting means or platform for a plurality of drills.

It is an object of this invention, to provide a drilling rig which eliminates the heavy work of lifting and holding drilling machines.

It is an object of this invention to provide a drilling rig for mounting, on a vehicle, most of the drills now available on the market.

It is an object of this invention to provide means for mounting drills fulfulling the object of the last two preceding paragraphs and providing means for mounting a plurality of such drills.

It is also an object of this invention to provide a drill mounting rig for vehicle wherein a plurality of drills may be mounted and operated together.

Figure 1:
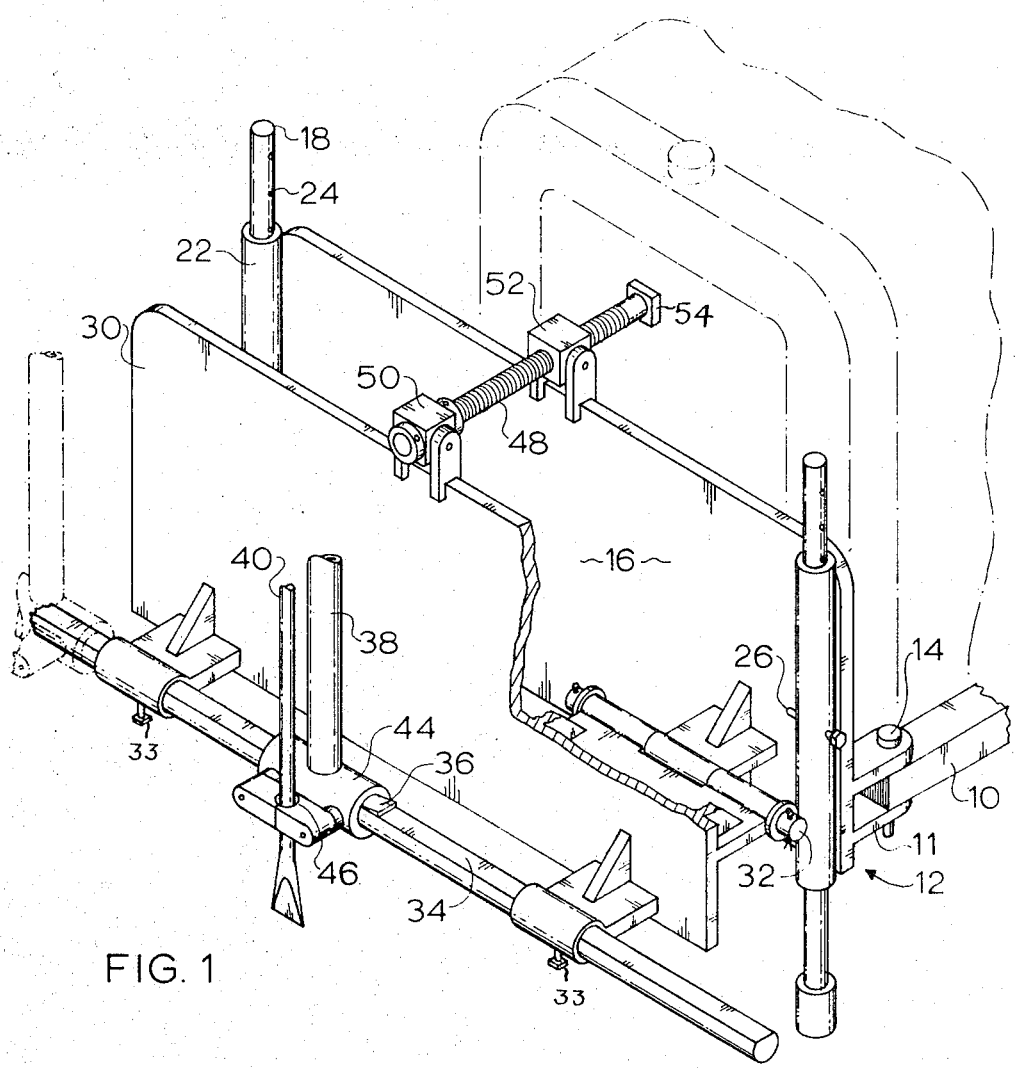

In drawings which illustrate a preferred embodiment of the invention:

FIG. 1 shows a perspective of the invention; and

Figure 2:
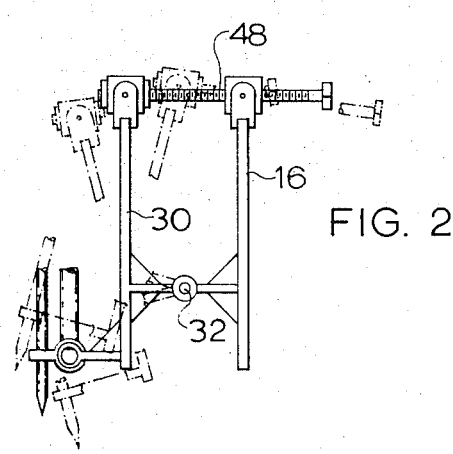

FIG. 2 demonstrates one facet of the adjustability of the device.

In the drawings is shown a portion 10 of a tractor frame (the forward end of the tractor being shown in dotted lines). However the drilling is designed for mounting on any vehicle.

A coupling member 12 is mounted thereon detachably but securely, such as by pins 14, which connect apertured ears 11 on the mounting memeber with a bore on the frame 10. Mounted by the means and rigidly connected to ears 11, the coupling member comprises a plate 16 located and oriented to have its plane usually, but not necessarily, extending vertically. On each side of plate 16 are provided tubular telescopic member 18 slidable in sleeves 22 on the plate, to contact the surface on which the vehicle rests to steady the coupling member 12 during operations of the drill. The coupling member may be adjusted in the tubular members in any desired manner such as by providing them with incrementally spaced cross bores 24 which will receive a bolt 26 passing through such bore and the diametrically opposed bores in the sleeve 22.

A drill mounting member comprising a plate 30 is pivotally connected to the coupling member 16 along an axis preferably parallel to the planes of the two plates (30 and 16) with the hinge connected as shown, by a bolt 32. Forwardly projecting from and preferably perpendicular to the plate 30 are two mounting projections which provide aligned bores extending, preferably, parallel to the hinge axis. These bores rotatably receive a drill mounting bar 34 of generally cylindrical form preferably provided with one flat surface extending longitudinally therealong. The bars 34, with drills mounted thereon, as hereinafter described, are rotatable relative to the plate 30, but may be fixed in a variety of desired orientations by tightening set screws 33.

The drill mounting bar 34 is designed to mount conventional drills of the type normally used and may take any form useful for this purpose. Thus the rotatable mounting may be varied to suit the type of drills mounted, however, the type shown seems most preferable for the commonest drill the "Bench Rock Feed Drill" and the method of fixing the drill standard 38 on the shaft may be any method but there is here suggested a wedge 36 which on the one hand couples to the flat surface of the mounting bar 34 and on the other hand wedges bar 34 into position in the sleeve 44 to which standard 38 is rigidly attached.

The drill 40 is not shown in detail but there is shown extending downwardly from the drill drive (not shown) through a ring 46 assembled in two parts, as shown, and rigidly mounted on sleeve 44. 40 is Although only one drill is shown in solid lines (another in dotted lines) it will be realized that as many of these as desired may be mounted on the same drill bar and this is one of the principal objects of the invention.

Accurate adjustment for the angle of drills mounted on the bar 34 and fixed in place by the wedges 36 and set screws 33 is provided by the screw mechanism connecting the coupling member and mounting member plates 16 and 30. A bolt or worm 48 is rotatably mounted in a bearing in block 50 which is pivotally mounted on the plate 30 to pivot about an axis parallel to the hinging axis and the bolt or worm 48 is threadedly mounted in a block 52 which is pivotally mounted on a coupling member. Projecting at the end of the bolt or worm is rotation control means therefor and this may be a manual member or a nut 54 as shown, for rotation by a tool, In operation, as many tools as required for the drilling operation are fixed in position on the mounting bar. Those drills located between the mounting bar are being mounted by being located in place and the bar threaded through sleeves 44. The tools are then fixed to the mounting bar by the insertion of wedges 36 or by alternative means not shown. The bar 34 is then slid and oriented to the location and the approximate orientation required and fixed in place by the set screws shown.

On the site where the equipment is to be used the tubes 18 are lowered to contact the ground and fixed in position and act, during drilling, to steady the coupling member and hence the whole assembly.

Further adjustment of the drilling angle for all drills is achieved by operation of the bolt 48 which, rotated in one direction, tilts the drill 40 and the drilling angle toward the machine and in the other direction, tilts the drill 40 and the drilling angle away from the machine.

I claim:

1. A drilling rig comprising:
   a coupling member for attachment to a vehicle with said coupling member in a predetermined attitude;
   a mounting member connected to said coupling member by a hinge;
   means for mounting a plurality of drills on said mounting member; and
   means for adjusting the hinge angle between said coupling member and said mounting member,
   wherein said means for mounting a plurality of drills comprises:
   a drill mounting bar having a longitudinal extension direction rotatably adjustable on said mounting member, about an axis corresponding to said longitudinal extension direction with means for fixing the rotational orientation of said bar, said bar being provided with means for mounting a plurality of drills thereon.

2. A device as claimed in claim 1 wherein said axis of rotation of said bar is approximately parallel to the hinging axis.